(12) United States Patent
Scheie et al.

(10) Patent No.: US 7,399,809 B1
(45) Date of Patent: Jul. 15, 2008

(54) MODIFYING POLYETHYLENE MADE BY ZIEGLER OR SINGLE-SITE CATALYST WITH FREE RADICAL INITIATOR

(75) Inventors: Andrew J. Scheie, Cincinnati, OH (US); Mark K. Reinking, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 11/652,236

(22) Filed: Jan. 11, 2007

(51) Int. Cl.
*C08C 19/04* (2006.01)
*C08F 8/06* (2006.01)

(52) U.S. Cl. ............... 525/387; 525/333.8; 525/192; 525/194; 525/240; 526/160; 526/124.3

(58) Field of Classification Search ........... 525/387, 525/333.8, 192, 194, 240; 526/160, 124.3
See application file for complete search history.

(56) References Cited

U.S. PATENT DOCUMENTS

| | | | |
|---|---|---|---|
| 4,460,750 A * | 7/1984 | Thiersault et al. ........ | 525/333.8 |
| 4,483,938 A | 11/1984 | Rees | |
| 4,603,173 A | 7/1986 | Mack et al. | |
| 4,703,093 A | 10/1987 | Thurman | |
| 5,064,802 A | 11/1991 | Stevens et al. | |
| 5,534,472 A | 7/1996 | Winslow et al. | |
| 5,539,124 A | 7/1996 | Etherton et al. | |
| 5,554,775 A | 9/1996 | Krishnamurti et al. | |
| 5,599,761 A | 2/1997 | Turner | |
| 5,637,659 A | 6/1997 | Krishnamurti et al. | |
| 5,639,818 A | 6/1997 | Lee et al. | |
| 5,665,800 A | 9/1997 | Lai et al. | |
| 5,756,611 A | 5/1998 | Etherton et al. | |
| 6,147,172 A | 11/2000 | Brown et al. | |

FOREIGN PATENT DOCUMENTS

| | | |
|---|---|---|
| EP | 0 222 504 B1 | 2/1990 |
| WO | WO 0 222 504 A1 * | 5/1987 |

OTHER PUBLICATIONS

R. Shroff et al., "Long-Chain-Branching Index for Essentially Linear Polyethylenes", Macromolecules, 1999, pp. 8454-8464, 32(25).
R. Shroff et al., "New Measures of Polydispersity from Rheological Data on Polymer Melts", J. Applied Polymer Science, 1995, pp. 1605-1626, 57.

* cited by examiner

*Primary Examiner*—Ling-Siu Choi
(74) *Attorney, Agent, or Firm*—Shao-Hua Guo

(57) ABSTRACT

A method of modifying a polyethylene is disclosed. In the method ethylene or a mixture of ethylene and a C3-C10 α-olefin is polymerized in an organic solvent with a Ziegler or single-site catalyst to form an initial polyethylene solution. The initial polyethylene solution is then reacted with a free radical initiator to produce a modified polyethylene. The modified polymer has an enhanced melt elasticity and increased long chain branching index, and is essentially free of gel.

12 Claims, No Drawings

MODIFYING POLYETHYLENE MADE BY ZIEGLER OR SINGLE-SITE CATALYST WITH FREE RADICAL INITIATOR

FIELD OF THE INVENTION

The invention relates to a method of modifying a polyethylene. More particularly, the invention relates to the solution peroxidation of a polyethylene to improve its thermal processability.

BACKGROUND OF THE INVENTION

Free radical polymerization of ethylene, with or without the presence of comonomers, produces low density polyethylene (LDPE). LDPE has excellent thermal processability but low mechanical strength due to its high concentration of long chain branches. Ziegler and single-site catalysts generally produce linear polyethylene which has little or no long chain branching. Linear polyethylene can be high density, medium density, or low density depending on the amount of longer chain α-olefins incorporated. Linear polyethylenes usually have superior strength at equivalent densities compared with LDPE. However, linear polyethylenes usually have unsatisfied thermal processability.

Methods to improve the processability of polyethylenes have been developed to allow for the easier processing of polyethylene products. One approach is to combine the polyethylene with a free radical initiator in a single or double-screw extruder. This process is generally performed at a temperature sufficient to melt the polyethylene and to allow the polyethylene to react with the peroxide, see, for example, U.S. Pat. Nos. 4,603,173 and 5,639,818. While thermal peroxidation in an extruder can result in long chain branching, which improves the melt strength, the process can also lead to unwanted crosslinking and gel formation.

It would be commercially useful to have a method of modifying polyethylenes that improves their processability without the undesirable side effects.

SUMMARY OF THE INVENTION

The invention relates to a method of solution peroxidation that results in a modified polyethylene with increased long-chain branching and enhanced melt strength. The method of the invention involves polymerizing ethylene or a mixture of ethylene and a C3-C10 α-olefin in an organic solvent with a Ziegler or single-site catalyst to form an initial polyethylene solution. The initial polyethylene solution is then reacted with a free radical initiator to produce a modified polyethylene. Surprisingly we found that the modified polyethylene not only has improved melt strength and increased long chain branch index (LCBI), but also is essentially free of gel.

DESCRIPTION OF THE INVENTION

The method of the invention comprises polymerizing ethylene or a mixture of ethylene and a C3-C10 α-olefin in an organic solvent with a Ziegler or single-site catalyst to produce an initial polyethylene solution.

Ziegler catalysts are well known in the art. Preferred Ziegler catalysts include titanium halides, titanium alkoxides, vanadium halides, and mixtures thereof, especially, $TiCl_3$, $TiCl_4$, mixtures of $VOCl_3$ with $TiCl_4$, and mixtures of $VCl_4$ with $TiCl_4$. Suitable Ziegler catalysts also include magnesium chloride-supported $TiCl_3$, aluminum chloride-supported mixtures of $VCl_4$ with $TiCl_4$, and the like. Other suitable Ziegler catalysts appear in U.S. Pat. No. 4,483,938, the teachings of which are incorporated herein by reference, and in Eur. Pat. No. 222,504. Suitable activators for Ziegler catalysts include tri-alkylaluminum compounds and dialkylaluminum halides such as triethylaluminum, trimethylaluminum, diethyl aluminum chloride, and the like. These activators are generally used in an amount within the range of about 1:100 to about 100:1 moles per mole of the Ziegler catalyst.

Suitable single-site catalysts include the metallocene and non-metallocene single-site catalysts. Suitable single-site catalysts comprise, for example, transition metal complexes with neutral or anionic ligands. The transition metals are in Groups 3-10 of the Periodic Table. Suitable ligands are, for example, substituted or unsubstituted cyclopentadienyls, borabenzenes, indenyls, fluorenyls, halide, alkyl, dialkylamino, siloxy, alkoxy, pyrrolyl, indolyl, carbazoyl, quinolinyl, pyridinyl, and azaborolinyl groups, the like, and mixtures thereof. Preferred catalysts contain a heteroatomic ligand such as borabenzene, pyrrolyl, quinolinyl, pyridinyl, azaborolinyl, the like, and mixtures thereof. Examples of suitable catalysts include bis(cyclopentadienyl)titanium dichloride, bis(cyclopentadienyl)zirconium dichloride, bis(1, 2-dimethylcyclopentadienyl)zirconium dichloride, bis(n-butylcyclopentadienyl)zirconium dichloride, bis(indenyl)zirconium dichloride, ansa-dimethylsilyl-bis(cyclopentadienyl) zirconium dichloride, ansa-dimethylsilyl-bis(indenyl) zirconium dimethyl, bis(1-methylboratabenzene)zirconium dichloride, bis(1-methylboratabenzene)titanium dichloride, (cyclopentadienyl)(1-methyl-boratabenzene)zirconium dichloride, and the like. Suitable single-site catalyst includes the so called constrained geometry catalyst disclosed, e.g., by U.S. Pat. No. 5,665,800. Others appear in U.S. Pat. Nos. 5,756,611, 5,637,659, 5,554,775, 5,539,124 and 6,147,172, and their teachings are incorporated herein by reference.

Suitable activators for single-site catalysts include alumoxane compounds such as methyl alumoxane, ethyl alumoxane, polymeric alumoxane, the like, and mixtures thereof. Suitable non-alumoxane activators for the single-site catalysts include alkyl aluminums, alkyl aluminum halides, anionic compounds of boron or aluminum, trialkylboron and triarylboron compounds, the like, and mixtures thereof. Examples include triethylaluminum, trimethylaluminum, diethylaluminum chloride, lithium tetrakis(pentafluorophenyl) borate, triphenylcarbenium tetrakis(pentafluorophenyl) borate, lithium tetrakis(pentafluorophenyl) aluminate, tris (pentafluorophenyl) boron, tris(pentabromophenyl) boron, and the like. Other suitable activators are known, for example, in U.S. Pat. Nos. 5,756,611, 5,064,802, and 5,599,761, and their teachings are incorporated herein by reference. Activators are generally used in an amount within the range of about 0.01 to about 100,000, preferably from about 0.1 to about 1,000, and most preferably from about 0.5 to about 50, moles per mole of the single-site catalyst.

When ethylene is polymerized with a Ziegler or single-site catalyst, a high density polyethylene is produced. C3-C10 α-olefins are used to adjust the density of the polyethylene. Usually, more C3-C10 α-olefins are incorporated into the polyethylene, the lower the polyethylene density. Suitable C3-C10 α-olefins include propylene, 1-butene, 1-pentene, 1-hexene, 1-octene, the like, and mixtures thereof. Particularly, a mixture of ethylene with up to 40 wt % of C3-C10 α-olefin is preferred. Suitable polyethylenes include high density polyethylene (HDPE), medium density polyethylene (MDPE), and linear low density polyethylene (LLDPE), and mixtures thereof. HDPE has a density of about 0.941 g/cm$^3$ or greater; MDPE has density from about 0.926 to 0.940 g/cm$^3$; and LLDPE has a density from about 0.845 to 0.925 g/cm$^3$. The density of the above mentioned polyethylenes can be measured according to the procedure in ASTM D1505.

The polymerization is conducted in a solution. Saturated aliphatic and aromatic hydrocarbons are suitable solvents. It is desirable to use a solvent having a relatively high boiling point so that the polymerization and the subsequent reaction of the polyethylene with free radical initiator can be carried out at a relatively high temperature without generating a high vapor pressure from the solvent. Suitable solvents include pentane, hexane, heptane, octane, toluene, xylene, cyclohexane, and mixtures thereof such as Isopar® G solvent (product of Exxon Chemical Company).

The polymerization can be conducted continuously, semi-continuously, or batchwise. It can be conducted in a single reactor or single stage or in multiple reactors or multistage. In a multi-reactor or multistage process, a same catalyst, Ziegler or single-site, can be used in all of the reactors or stages. Alternatively, each reactor or stage uses a different catalyst. For instance, a single-site catalyst is used in a first reactor or first stage, and a Ziegler catalyst is used in a second reactor or second stage. Multi-reactor and multistage processes are often used to produce multimodal polyethylenes.

The initial polyethylene solution preferably contains an initial polyethylene within the range of about 10% to about 90% based on the total weight of the solution. More preferably, the polyethylene is within the range of about 10% to 50% of the solution weight.

The initial polyethylene solution is then reacted with a free radical initiator. The reaction is performed at a temperature above the decomposition temperature of the initiator. One advantage of the invention is that the reaction temperature can be easily controlled so that essentially no crosslinking reaction of the polyethylene occurs. The modified polyethylene is thus essentially free of gel. Preferably, the reaction temperatures is within the range of about 100° C. to about 300° C., more preferably from about 100° C. to about 250° C. and most preferably from about 150° C. to about 200° C.

Suitable free radical initiators include those known in the polymer industry such as peroxides, hydroperoxides, peresters, and azo compounds. Suitable free radical initiators include dicumyl peroxide, di-t-butyl peroxide, t-butylperoxy-benzoate, 2,5-dimethyl-2,5-di(t-butylperoxy)hexane, t-butyl peroxyneodecanoate, 2,5-dimethyl-2,5-di(t-butylperoxy)hexyne, t-amyl peroxypivalate, 1,3-bis(t-butylperoxyisopropyl)benzene, tert-amylperoxy 2-ethyl hexanoate, t-butylperoxy 2-ethyl hexanoate, t-butyl peroxy isobutyrate, t-butylperoxy isopropyl carbonate, t-butylperoxy 3,5,5-trimethylhexanoate, 2,5-dimethyl-2,5-di(benzolyperoxy)hexane, n-butyl 4,4-di(t-butylperoxy)valcratic, t-butylcumyl peroxide, di(2-t-butylperoxy isopropyl)benzene, t-butyl hydroperoxide, cumyl hydroperoxide and mixtures thereof. Examples of suitable azo compounds include 2,2'-azobisisopropionitirile, 2,2'-azobisisobutyronitrile (AIBN), dimethyl azoisobutyrate, 1,1'-azobis (cyclohexanecarbonitrile), 2,2'-azobis(2-methylpropane), the like, and mixtures thereof. Most preferably the free radical initiator is selected from the group consisting of dicumyl peroxide, di-t-butyl peroxide, cumyl hydroperoxide, 2,5-dimethyl-2,5-di-t-butylperoxy hexyne, the like, and mixture thereof.

Preferably, the free radical initiator is used in an amount within the range of about 50 to about 5,000 ppm of the polymer, more preferably from about 300 to about 4,500 ppm of the polymer, and most preferably from about 500 ppm to about 4,000 ppm of the polymer. Suitable solvents for the reaction of the initial polyethylene solution with the free radical initiator are discussed above. The reaction can be carried out by adding the free radical initiator to the initial polyethylene solution. Alternatively, an additional amount of the same solvent as used in the polymerization or a different solvent can be added to facilitate the reaction.

The solvent is removed and a modified polyethylene is resulted. The solvent can be removed by flashing, distillation, or any other suitable methods. The modified polyethylene has a significantly increased long chain branching index (LCBI). LCBI is a rheological index used to characterize low levels of long-chain branching in essentially linear polyethylenes. LCBI is defined as:

$$LCBI = \frac{\eta_0^{0.179}}{4.8 \cdot [\eta]} - 1$$

where $\eta_0$ is the limiting, zero-shear viscosity (Poise) at 190° C. and $[\eta]$ is the intrinsic viscosity in trichlorobenzene at 135° C. (dl/g). LCBI is based on observations that low levels of long-chain branching, in an otherwise linear polymer, result in a large increase in melt viscosity, $\eta_0$, with no change in intrinsic viscosity, $[\eta]$. See R. N. Shroff and H. Mpyridis, "Long-Chain-Branching Index for Essentially Linear Polyethylenes," Macromolecules, Vol. 32 (25), pp. 8454-8464 (1999). Higher LCBI means a greater number of long-chain branches per polymer chain. When LCBI equals zero, there is no long-chain branching.

Preferably, the LCBI of the modified polyethylene is about 100% to about 1000% higher than the LCBI of the initial polyethylene. More preferably the LCBI of the modified polyethylene is about 150% to about 900% higher than the LCBI of the initial polyethylene. Most preferably, the LCBI of the modified polyethylene is about 200% to about 800% higher than the LCBI of the initial polyethylene.

The modified polyethylene has significantly increased melt elasticity. Melt elasticity (ER) provides a guide to the polymer's processability in the molten state. It is a measure of the elasticity or the polydispersity of the polyethylene. Determination of ER uses frequency response data in the linear viscoelastic region. That is, ER is derived from the measured dynamic storage modulus, G', and loss modulus, G", as a function of frequency. Generally speaking, G' is a measure of energy stored and recovered per cycle of sinusoidal deformation; G" is a measure of energy dissipated or lost as heat per cycle. In one method, G' versus G" is plotted in logarithmic coordinates resulting in a curve that is dependent upon MWD and/or LCB and is practically independent of temperature and molecular weight. For more information of the calculation of ER see for example, U.S. Pat. No. 5,534,472, which is herein incorporated by reference. Or see Shroff, et al., entitled "New Measures of Polydispersity from Rheological Data on Polymer Melts," J. Applied Polymer Science, Vol. 57, pp. 1605-1626 (1995).

Preferably, the ER of the modified polyethylene is about 50% to about 250% higher than the ER of the initial polyethylene, more preferably about 75% to about 200%, and most preferably about 100% to about 150% higher than the ER of the initial polyethylene.

One advantage of the invention is that the modified polyethylene is essentially free of gel. The known process in the art involves reacting a polyethylene in an extruder with a free radical initiator. The extrusion process often causes gel formation or crosslinking because the polyethylene is exposed to extreme heating and shearing. To determine the gel concentration, the polymer is soaked in a refluxing xylene for 12 hours. Any insoluble portion of the polymer is isolated, dried and weighed, calculating the percentage of the insoluble polymer over the total weight of the polymer. For purposes of this invention, the term "essentially free of gel" means the percent of gel is less than about 0.1 wt %, preferably less than about 0.01 wt %, more preferably less than about 0.005 wt %, and most preferably less than 0.001 wt %.

The following example merely illustrates the invention. Those skilled in the art will recognize many variations within the spirit of the invention and scope of the claims.

EXAMPLE 1

Peroxidation at 200° C. with 700 ppm Peroxide

A high density polyethylene (HDPE) (Alathon® M 6020, product of Equistar Chemicals, LP) is commercially made by a Ziegler catalyst. The HDPE is dissolved in hexadecane at 275° C. and then the solution cooled to the room temperature. The HDPE is precipitated, washed three times with heptane (250 ml per wash) and dried for 6 hours in a vacuum oven at 70° C. It, shown as "Control" in Table 1, has a melt index $MI_2$ of 1.04, weight average molecular weight Mw of 133,400, ER of 2.25, LCBI of 0.21, density of 0.957, and gel content of 0.00%. These properties are essentially the same as the properties of M6020 prior to the treatment.

The HDPE (25 g) and hexadecane (250 ml, Aldrich) are charged to a glass kettle (1-liter) fitted with a thermocouple, temperature controller, overhead stirrer, water-cooled condenser, $N_2$ inlet, and $N_2$ outlet connected to a bubbler. The kettle is placed in a fitted heating mantle. Nitrogen is sparged through the hexadecane for 20 minutes to remove air. A nitrogen purge is placed through the headspace in the reaction vessel to prevent air from entering the system. The HDPE is dissolved by heating to 200° C. while stirring the mixture.

2,5-Dimethyl-2,5-di-t-butylperoxy hexyne (4.40 g, Luperox® 130, product of Arkema Inc.) is dissolved in hexadecane (50 ml). The peroxide solution (0.21 ml, 750 ppm based on the HDPE) is added dropwise while stirring the HDPE and hexadecane solution at 200° C. After five minutes, the heating and stirring are stopped, and the solution is allowed to cool to room temperature. The polymer is precipitated, filtered, washed three times with heptane (250 ml per wash) and dried for 6 hours in a vacuum oven at 70° C.

The modified polyethylene has an $MI_2$ of 0.81, Mw of 138,600, ER of 3.63, LCBI of 0.53, density of 0.957, and gel content of 0.00%.

EXAMPLE 2

Peroxidation at 200° C. with 3000 ppm Peroxide

The general procedure of Example 1 is repeated except 3000 ppm of the peroxide is used. The modified polyethylene has an $MI_2$ of 0.64, Mw of 140,700, ER of 5.55, LCBI of 2.02, density of 0.954, and gel content of 0.00%.

COMPARATIVE EXAMPLE 3

Peroxidation at 275° C. with 750 ppm Peroxide

The general procedure of Example 1 is repeated except the reaction temperature is at 275° C. The modified polyethylene has an $MI_2$ of 1.75, Mw of 126,300, ER of 2.35, LCBI of only 0.19, density of 0.954, and gel content of 0.00%.

COMPARATIVE EXAMPLE 4

Peroxidation at 275° C. with 3000 ppm Peroxide

The general procedure of Example 2 is repeated except the reaction temperature is at 275° C. The modified polyethylene has an $MI_2$ of 1.64, Mw of 115,500, ER of 2.69, LCBI of only 0.32, density of 0.957, and gel content of 0.84%.

TABLE 1

Solution Peroxidation of Polyethylenes

| Ex. No. | Peroxide (ppm) | Temp. (° C.) | $MI_2$ | MW | ER | LCBI | Density | % Gel |
|---|---|---|---|---|---|---|---|---|
| Control | — | 275 | 1.04 | 133,400 | 2.25 | 0.21 | 0.957 | 0.00 |
| 1 | 750 | 200 | 0.81 | 138,600 | 3.63 | 0.53 | 0.957 | 0.00 |
| 2 | 3000 | 200 | 0.64 | 140,700 | 5.55 | 2.02 | 0.954 | 0.00 |
| C3 | 750 | 275 | 1.75 | 126,300 | 2.35 | 0.19 | 0.954 | 0.00 |
| C4 | 3000 | 275 | 1.64 | 115,500 | 2.69 | 0.32 | 0.957 | 0.84 |

We claim:

1. A process of producing a polyethylene comprising (a) polymerizing ethylene or a mixture of ethylene and a C3-C10 α-olefin with a Ziegler or single-site catalyst in an organic solvent to produce an initial polyethylene solution; (b) reacting the polyethylene solution with a free radical initiator at a temperature within the range of about 150° C. to about 250° C. to produce a modified polyethylene; and (c) isolating the modified polyethylene from the solution, wherein the modified polyethylene has an increase in melt elasticity (ER), and an increase in long chain branching index (LCBI) compared to the initial polyethylene, and wherein the modified polyethylene is essentially free of gel.

2. The process of claim 1 wherein the polyethylene is a high density polyethylene (HDPE).

3. The process of claim 1 wherein the organic solvent is a $C_6$ to $C_{16}$ hydrocarbon.

4. The process of claim 1 wherein the organic solvent is selected from the group consisting of hexadecane, toluene, xylene, hexane, cyclohexane, and mixtures thereof.

5. The process of claim 1 wherein the free radical initiator is selected from the group consisting of dicumyl peroxide, di-t-butyl peroxide, cumyl hydroperoxide, t-butyl hydroperoxide, 2,5-dimethyl-2,5-di-t-butylperoxy hexyne, and mixtures thereof.

6. The process of claim 1 wherein the free radical initiator is used in an amount within the range of about 50 to about 5000 ppm of the initial polyethylene.

7. The process of claim 1 wherein the free radical initiator amount is used in an amount within the range of about 500 to about 4000 ppm of the initial polyethylene.

8. The method process of claim 1 wherein the LCBI of the modified polyethylene is about 100 to about 1000% higher than the LCBI of the initial polyethylene.

9. The process of claim 1 wherein the LCBI of the modified polyethylene is about 200 to about 800% higher than the LCBI of the initial polyethylene.

10. The process of claim 1 wherein the ER of the modified polyethylene is about 50% to about 250% higher than the ER of the initial polyethylene.

11. The process of claim 1 wherein the ER of the modified polyethylene is about 100% to about 150% higher than the ER of the initial polyethylene.

12. The process of claim 1 wherein the modified polyethylene has, compared to the initial polyethylene, an increase in the ER of about 100% to about 150% and an increase in the LCBI of about 200% to about 800%.

* * * * *